United States Patent [19]

Davis et al.

[11] Patent Number: 5,021,922
[45] Date of Patent: Jun. 4, 1991

[54] PORTABLE PERSONAL COMPUTER

[75] Inventors: Myron F. Davis, Boca Raton, Fla.; Randall W. Martin, The Woodlands, Tex.; Hideo Nomura, Yokohama, Japan; Richard F. Pollitt, Highland Beach; Ernest Wittner, Baco Raton, both of Fla.; Wataru Yoshikawa, Fujisawa, Japan

[73] Assignee: International Business Machines Corporation, Armonk, N.Y.

[21] Appl. No.: 441,030

[22] Filed: Nov. 22, 1989

[30] Foreign Application Priority Data

Nov. 30, 1988 [JP] Japan ................. 63-300808

[51] Int. Cl.5 ................. H05K 5/00; G06F 1/00
[52] U.S. Cl. ................. 361/380; 361/394; 364/708; 248/920
[58] Field of Search ............. 364/708; 361/346, 380, 361/390, 391, 392; 248/918, 919, 920, 921, 922, 923; 312/208, 248, 277, 313, 315; 455/89, 90, 347, 348, 349, 351

[56] References Cited

U.S. PATENT DOCUMENTS 4,704,604 11/1987 Fabs .................. 248/918
4,718,740 1/1988 Cox .
4,832,419 5/1989 Mitchell et al. .......... 312/208
4,862,353 8/1989 Williams ............... 364/708

FOREIGN PATENT DOCUMENTS 0102028 8/1980 Japan ................. 361/380
0095782 5/1985 Japan ................. 361/380
0189523 9/1985 Japan ................. 364/708

OTHER PUBLICATIONS

IBM Technical Disclosure Bulletin; vol. 28, No. 6, Nov. 1985; pp. 2361-2363.
WO-A-8 606 516 (NCR Corp.), p. 2, paragraphs 1-4; p. 6, paragraph 2-p. 7, parargraph 1; FIGS. 2, 5.

Primary Examiner—Leo P. Picard
Assistant Examiner—Michael W. Phillips
Attorney, Agent, or Firm—Martin J. McKinley

[57] ABSTRACT

The computer is adapted to be used and stored on its narrow bottom surface (24), which has an area which is less than the area of the front surface (25) of the computer. A keyboard (4) is pivotally mounted to the back of a cover on the front surface. A floppy disk drive (3) is pivotally mounted behind the cover and the drive can be operated in the open or closed positions. A movable flat display (2) is positioned parallel to the front surface of the computer when the display is in the retracted position. A frictional mechanism (FIG. 5A) permits the display to be positioned at any angle.

5 Claims, 11 Drawing Sheets

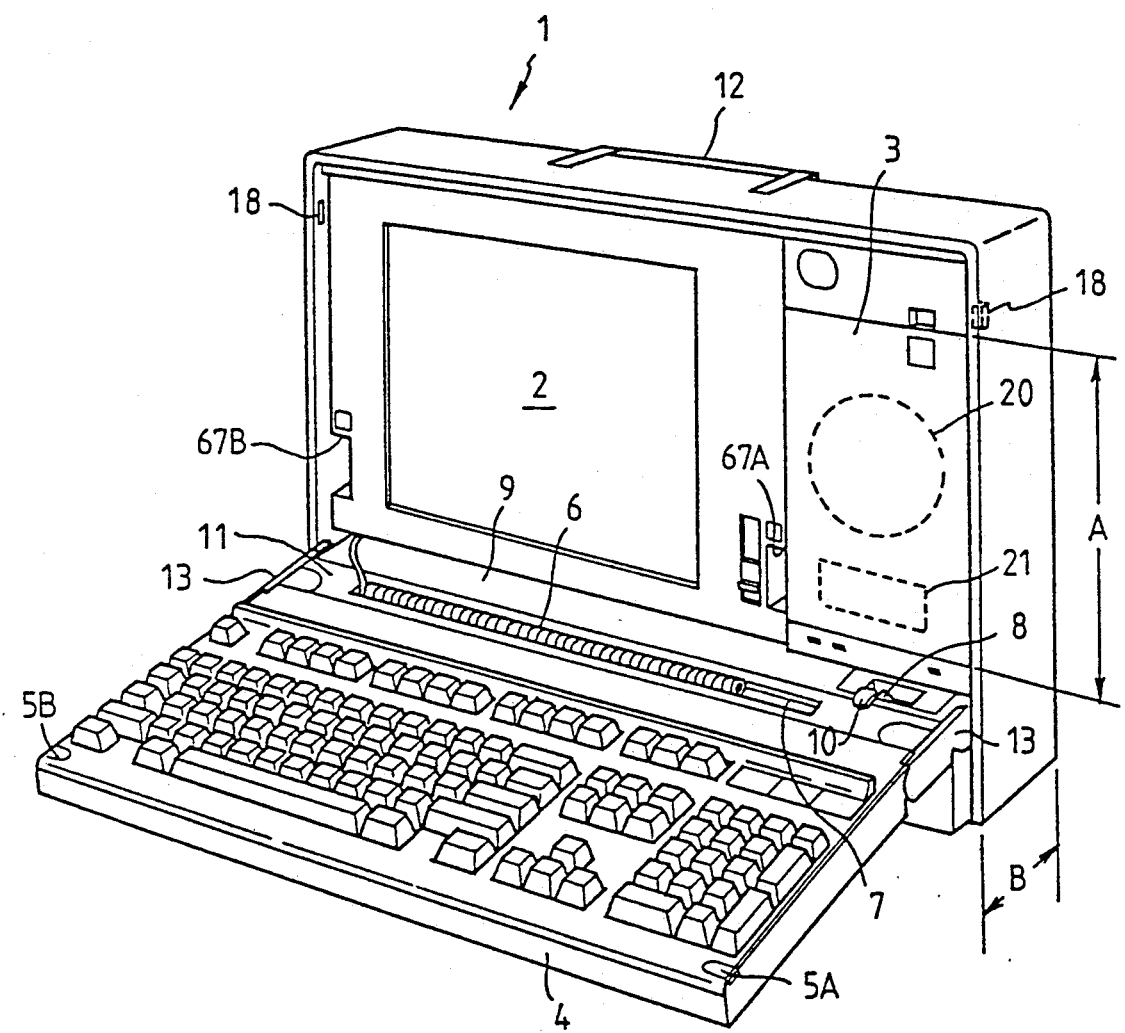
FIG. 1

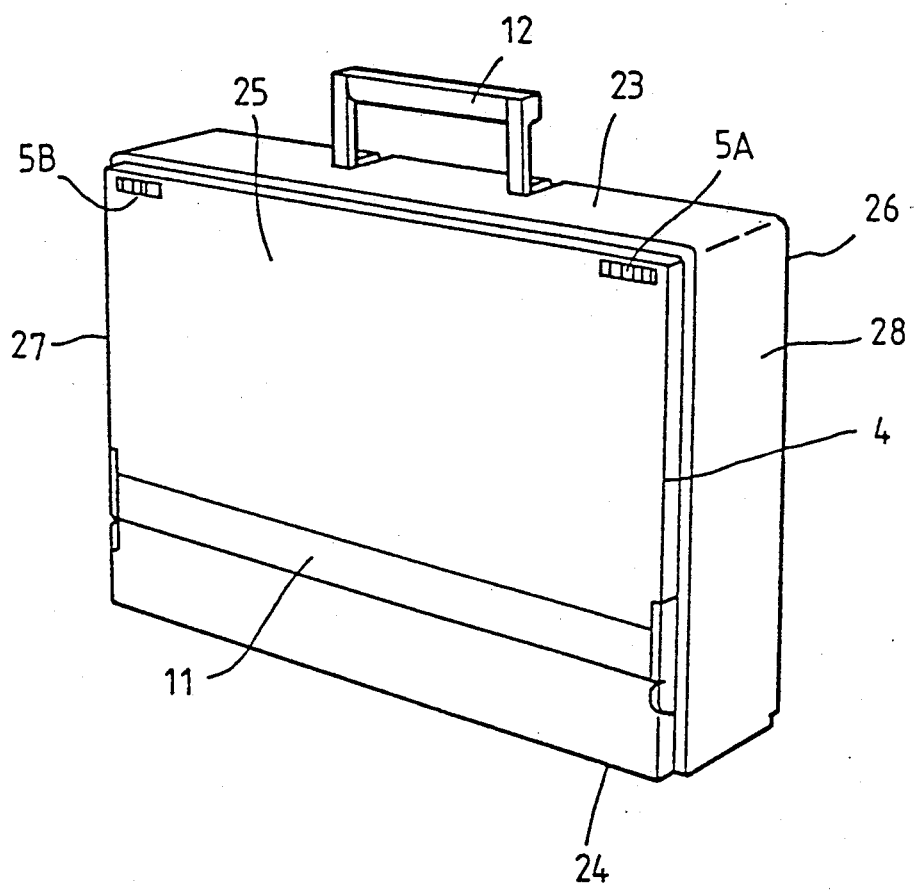
FIG. 2

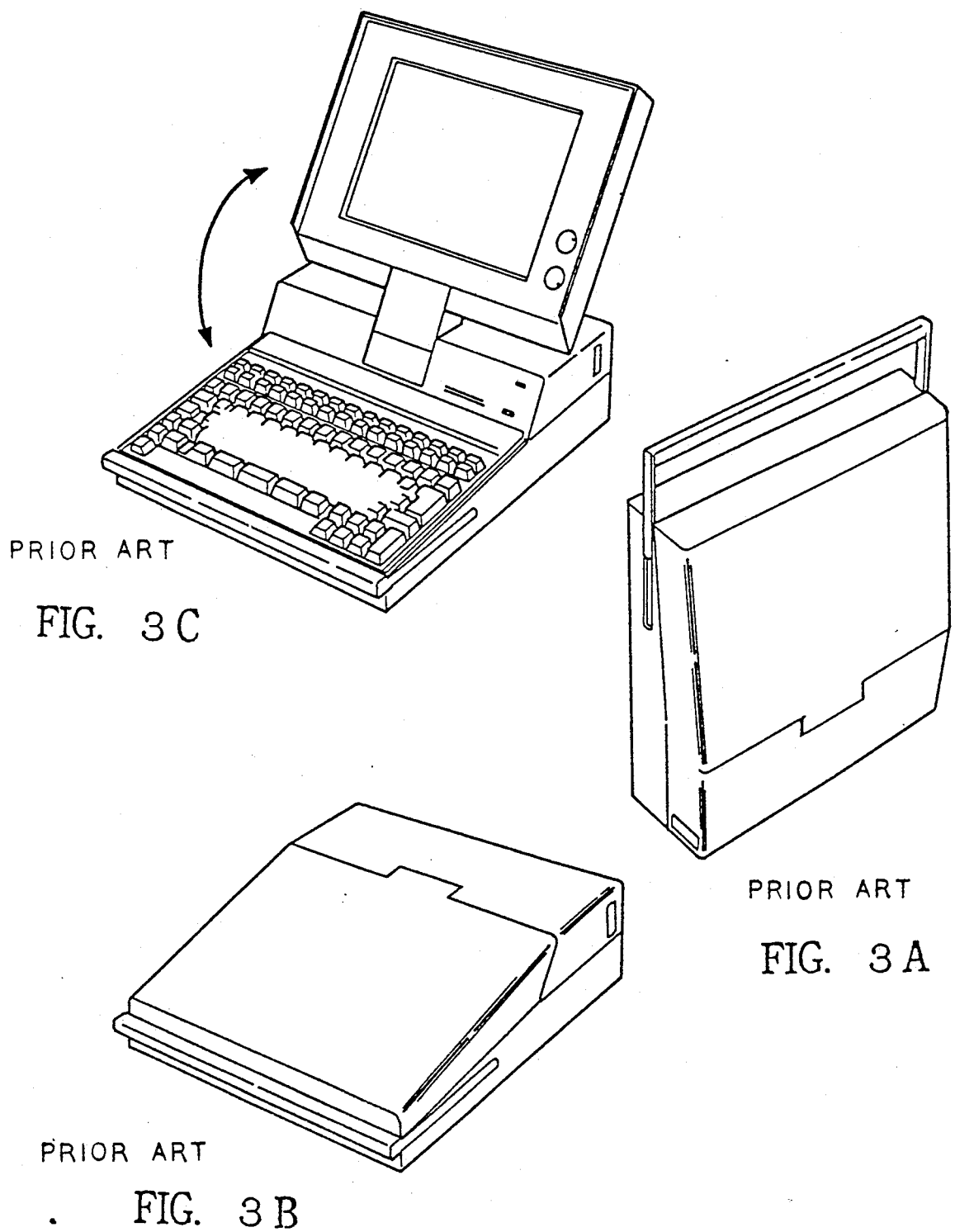
PRIOR ART
FIG. 3C
PRIOR ART
FIG. 3A
PRIOR ART
FIG. 3B

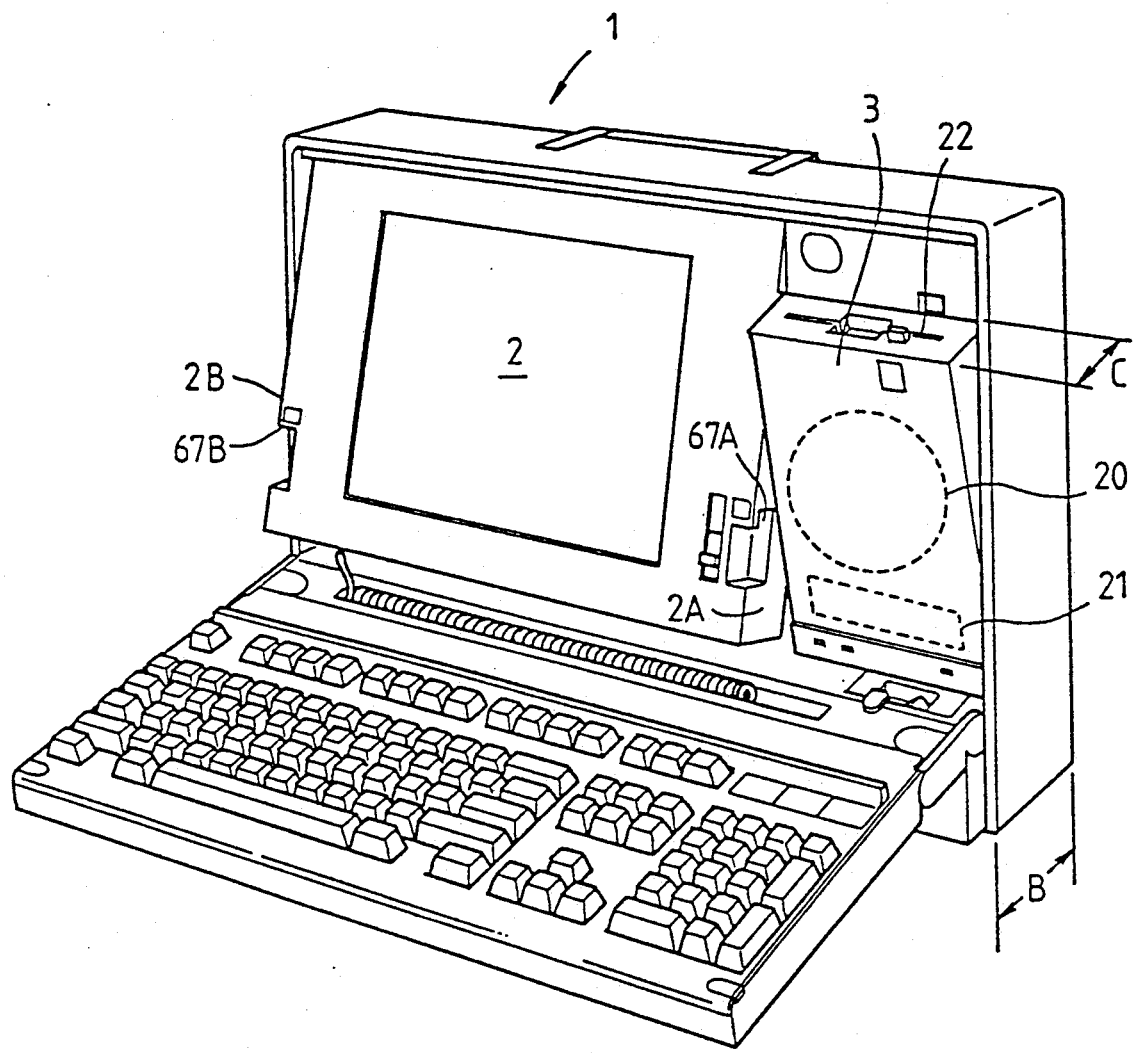
FIG. 4

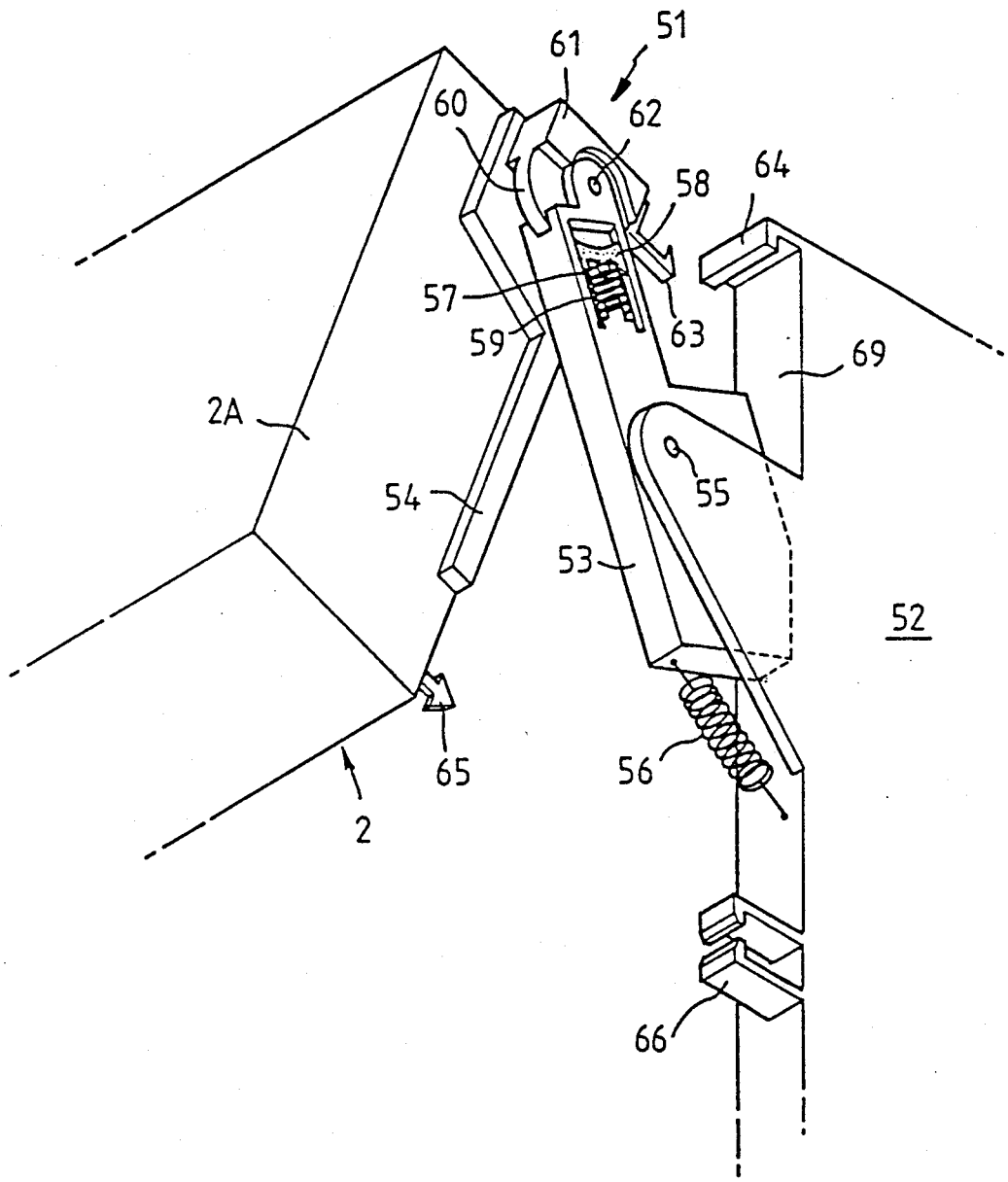
FIG. 5A

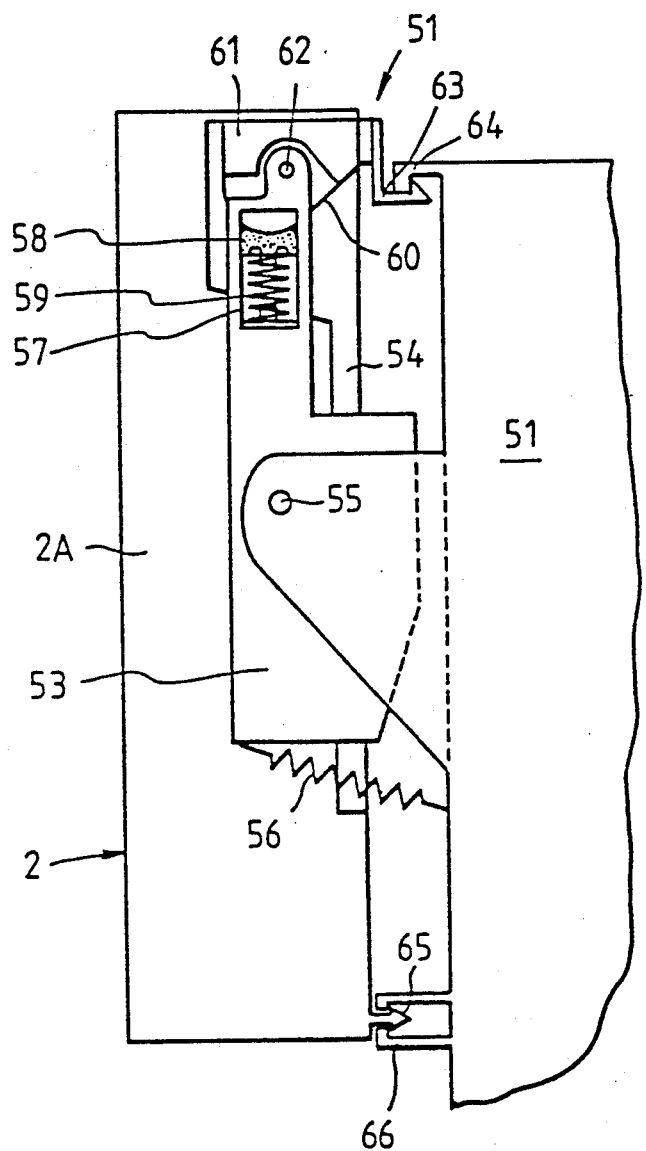
FIG. 5B

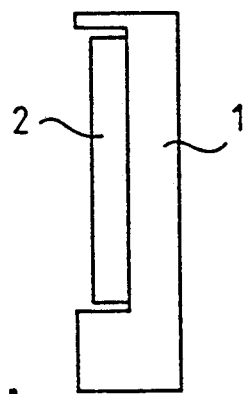
FIG. 6A
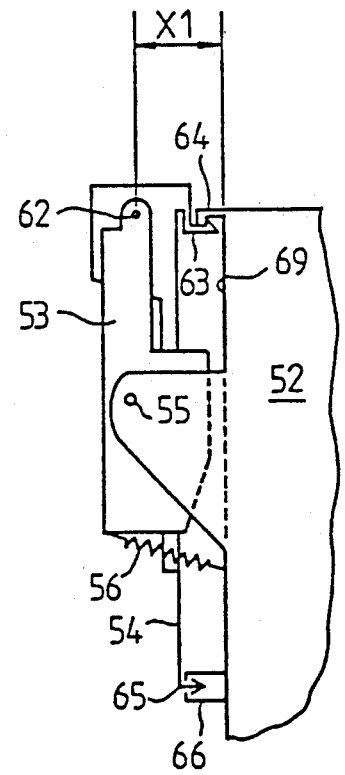
FIG. 6B

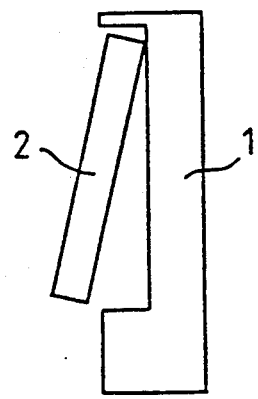
FIG. 7A
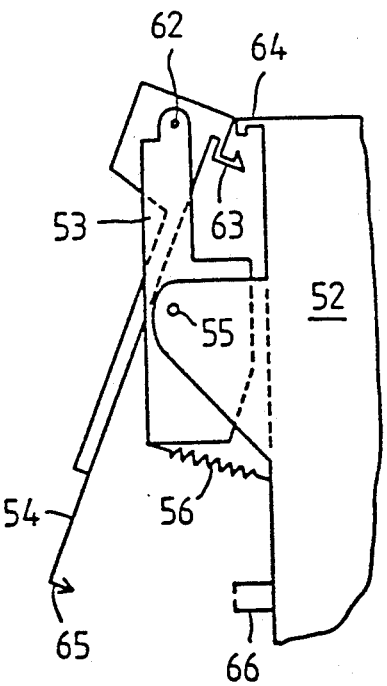
FIG. 7B

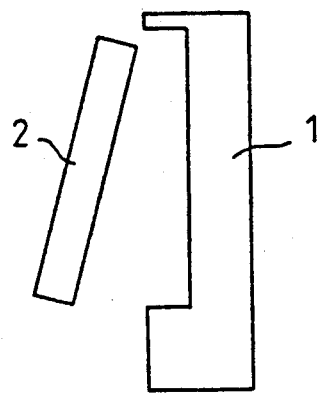
FIG. 8A
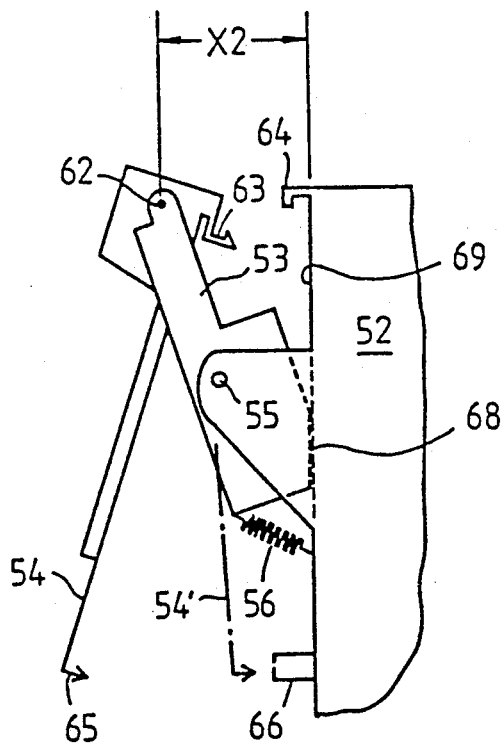
FIG. 8B

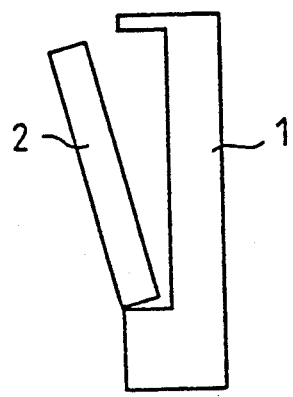
FIG. 9A
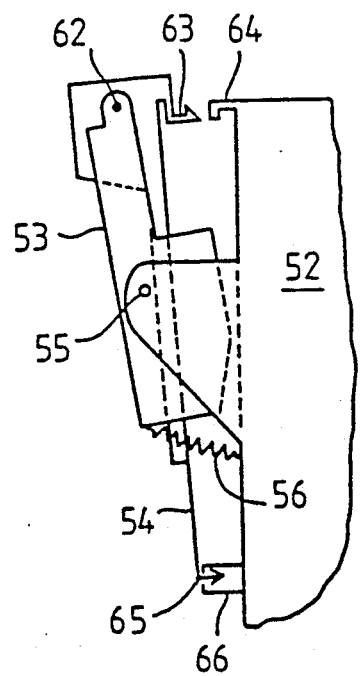
FIG. 9B

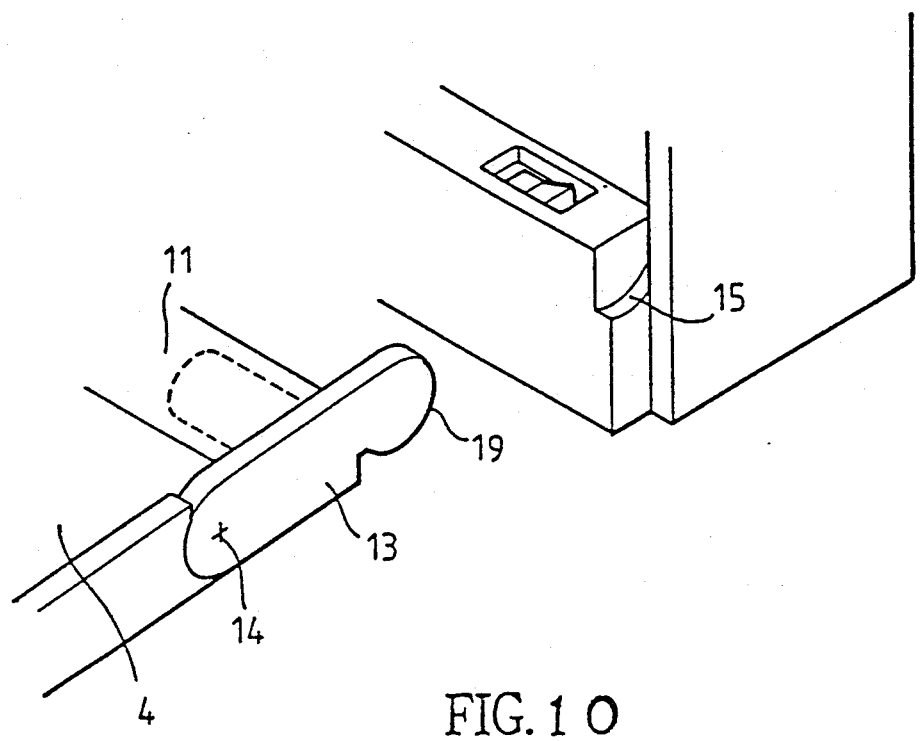
FIG. 10
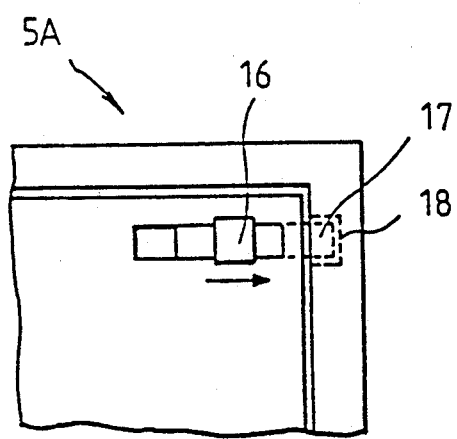
FIG. 11

PORTABLE PERSONAL COMPUTER

BACKGROUND OF THE INVENTION

This invention pertains to computers and, more particularly, to a portable personal computer that requires a minimum of space on a supporting desk top.

Various portable personal computers have been developed. Most of these computers are suitcase type as shown in FIG. 3A. For carrying the computer, a handle is provided on the top. When not in use, the computer is placed on the desk, as shown in FIG. 3A. When the computer is in use, the computer is laid on the desk, as shown in FIG. 3B, and a cover is opened, as shown in FIG. 3C. A flat display device is mounted on the back of the cover. By opening the cover, a keyboard appears.

The prior art personal computer has inherent disadvantages. That is, when the personal computer is in use, it must be laid down, as shown in FIG. 3B, so that the area contacting the desk is large, and the space available on the desk top for other purposes is remarkably decreased. Furthermore, the operator who frequently uses the computer tends to store it on the desk in the horizontal position shown in FIG. 3B, because its burdensome to store the computer in the upright position shown in FIG. 3A, and then have to move the computer to the position shown in FIGS. 3B and 3C whenever he or she wants to operate it.

Portable personal computers of the type shown in the FIGS. 3A-3C are disclosed in U.S. Pat. Nos. 243,250 and 4,497,036.

U.S. Pat. No. 4,669,053 discloses a personal computer similar to the one in FIGS. 3A-3C. In this particular patent, a disk drive unit is retractably mounted on the top surface of the personal computer, a retractable keyboard is pivotally mounted on a front surface, and a display device is fixedly attached in a position substantially parallel to the front surface. This computer has a bottom surface that is larger than the front surface, such that it requires a large space of the desk top.

U.S. Pat. No. 4,294,496 discloses a portable personal computer wherein a keyboard enclosure is hinged to a frame enclosure in such a manner that it is possible to fold the keyboard up against the frame and to latch the two together. A disk drive unit is mounted in such a manner that a surface or plane of a diskette in the drive unit is parallel to the left and right side surfaces of the computer. This computer requires a large space on the desk top.

U.S. Pat. No. 4,496,943 discloses a compact portable information display system of a size that fits under a typical airline seat. It includes a fixedly mounted cathode ray tube display and a retractable keyboard pivotally mounted on a front surface. Due to the cathode ray tube display, it requires a large distance between the front and back surface.

U.S. Pat. No. 4,660,111 discloses a lifting mechanism for a floppy disk drive, which differs from the mechanism of the present invention.

SUMMARY OF INVENTION

An object of invention is to provide a portable personal computer that requires a minimum of space on a desk top whether it is in or out of use.

Briefly, the invention is a portable computer that includes a substantially rectangular parallelepiped case having front and bottom surfaces. The front surface of the case is substantially perpendicular to the bottom surface, and the area of the bottom surface is less than the area of the front surface. The bottom surface is adapted for placement on a supporting horizontal surface. The front surface includes a pivotally mounted cover and a keyboard mounted on the inside of the cover. The computer is adapted to be used and stored while supported on the bottom surface.

BRIEF DESCRIPTION OF THE DRAWINGS

FIG. 1 shows the portable personal computer of the present invention with the keyboard positioned in the open position.

FIG. 2 shows the portable personal computer of the present invention with the keyboard in the closed position.

FIGS. 3A, 3B and 3C show a prior art personal computer.

FIG. 4 shows the portable personal computer of the present invention wherein the flat display device and the floppy disk drive unit are positioned in the pulled out position.

FIGS. 5A and 5B show the moving mechanism for moving the display device.

FIGS. 6A, 6B, 7A, 7B, 8A, 8B, 9A and 9B show the movement of the display and associated mechanism.

FIG. 10 shows the coupling of the keyboard and the personal computer.

FIG. 11 shows a mechanism for latching the keyboard to the personal computer.

DESCRIPTION OF THE PREFERRED EMBODIMENTS

Referring to FIG. 1, a portable personal computer 1 includes a flat display device 2, a floppy disk drive unit 3, and a keyboard 4. The keyboard 4 is pivotally mounted on a frame of the computer 1, and pivoted between the opened position, as shown in FIG. 1, and a retracted position, as shown in FIG. 2. That is, keyboard 4 acts as a cover for the computer 1. Both the flat display device 2 and floppy disk drive unit 3 are also movable between the retracted position shown in the FIG. 1, and the position shown in FIG. 4. Mechanisms for moving the display device 2 and the floppy disk drive unit 3 are described hereinafter.

Referring to FIG. 2, the case of the portable personal computer 1 has a top surface 23, a bottom surface 24, a front surface 25, a back surface 26, a left side surface 27 and a right side surface 28. The area of the bottom surface 24 is smaller than the area of each of the front surface 25 and the back surface 26. The bottom surface is placed on a desk top not only when the computer is in use ("in operation"), but also when not in use ("in storage").

Referring to FIG. 1, the keyboard 4 is mounted on a back side of the cover. The cover constitutes a main part of the front surface.

A hard disk drive unit, a power supply circuit, a microprocessor, and various circuit boards are mounted within the personal computer 1. To simplify the drawings, these are not shown in FIGS. 1, 2 and 4.

The display device 2 is a plasma display device, a liquid crystal display or other flat display device.

The keyboard 4 is retained in the retracted or closed position by the latch mechanism 5A and 5B. The mechanism is described hereinafter with reference to FIG. 11. The keyboard 4 is electrically connected to the computer 1 by a cable 6, which is received in a groove 7 of a member 11.

A power switch 8 is mounted on a surface 9 of the computer 1. The switch 8 is a seesaw type switch. When a left end of the seesaw is in a high position, as shown in FIG. 1, the power is turned on. An extended tab 10 is provided on the member 11. When the keyboard 4 is closed, as shown in FIG. 2, the tab 10 pushes down on the raised left end of the seesaw switch 8 to automatically turn off the switch.

A handle 12 is mounted on the top surface of the personal computer 1.

Illustrated in FIGS. 5A and 5B, is a mechanism 51 for moving the flat display device 2 between a retracted and an extended or pulled out position. The mechanism is mounted between a right side wall 2A of the flat display device 2 and a frame 52 of the personal computer 1. A similar mechanism, which is a mirror image of the one shown in FIGS. 5A and 5B, is mounted between a left side wall 2B of the display device 2 and a left side frame. The mechanism 51 includes a first member 53 and a second member 54. The first member 53 is pivotally mounted to the frame 52 at a pivot point 55, and is biased in a counter-clockwise direction by a coil spring 56. A slot 57 is formed in the upper portion of the first member 53. A sliding shoe 58 and a coil spring 59 are movably mounted within the slot 57. The sliding shoe 58 is pressed to a cam surface 60 of a cam member 61 by the coil spring 59. The cam member 61 is rigidly mounted on the second member 54. Since the sliding shoe 58 is frictionally engaged against the cam surface 60, the display device 2 can be positioned at any angle relative to the front surface 25 of the computer. The second member 54 is pivotally mounted on the first member 53 at a pivot point 62. A first latch including an arrowhead shaped member 63 engages a receiving member 64, and a second latch including an arrowhead shaped member 65 engages a receiving member 66 to latch the display device 2 to frame 52.

FIGS. 6B, 7B, 8B and 9B illustrate the movement of the mechanism 51 and the flat display device 2 with respect to the frame 52.

In FIG. 6B, both arrowhead shaped members 63 and 65 are engaged with receiving members 64 and 66, respectively, so that the display device 2 is retained in the retracted position at which the keyboard 4 is closed, as shown in FIGS. 2 and 6A.

To disengage the first and second latches, the operator pulls the display device 2 out of the computer 1 by inserting his or her finger into the recessed portions 67A and 67B, which are formed on the right and left side of the display device 2, as illustrated in FIGS. 1 and 4. Since the second member 54 is rigidly coupled to the display, the arrowhead shaped member 65 is disengaged from the receiving member 66 and the second member 54 is rotated in the clockwise direction as the display is being pulled out of the computer. Furthermore, the arrowhead shaped member 63 is disengaged from the receiving member 64, so that the first member 53 starts to rotate in the counter-clockwise direction by the action of the coil spring 56. As the operator continues to apply pressure at the recessed portion 67A, the second member 54 maintains the position shown in FIG. 7B, while the first member 53 rotates until a back surface 68 is stopped by the frame 52, as shown in FIG. 8B.

It is apparent that when the display device 2 is retained in the retracted position, as shown in FIG. 6B, the distance between the pivot point 62 and a frame surface 69 is a minimum distance $X_1$, and when the display device is extended, as shown in FIG. 8B, the distance between the pivot point 62 and the frame surface 69 is a maximum distance $X_2$. As the flat display device 2 is moved from the retracted to the extended position, it is pivoted at the pivot point 62 between a positive angle position (see the position of the second member 54 in FIG. 8B) and a negative angle position (see the position of the second member 54' in FIG. 8B). The flat display device 2 may be retained at any angled position by the firm frictional engagement of the sliding shoe 58 to the cam surface 60.

To return the display device 2 to the retracted position, the operator pushes the lower part of the display to incline the display to the negative angled position, and then pushes the top part of the display so that the arrowhead shaped member 65 is latched into the receiving member 66, and the arrowhead shaped member 63 is latched into the receiving member 64, whereby the mechanism is returned to the original position shown in FIGS. 5B and 6B.

The floppy disk drive unit 3 will be described with reference to FIGS. 1 and 4. The floppy disk drive unit 3 includes a floppy load/unload slot 22 and a floppy disk drive device 21. A floppy disk 20 is loaded or unloaded through the slot 22. The drive device 21 is well known in the art, and includes a read/write head, a step motor, etc. The longitudinal dimension A, (FIG. 1) is larger than the depth B of the computer 1, and the depth C (FIG. 4) of the floppy disk drive unit 3 is smaller than the depth B. The floppy disk drive unit 3 is pivotally mounted at its bottom portion, and can be moved between a closed or retracted position shown in FIG. 1, and an open or pulled out position shown in FIG. 4. Since the pivot mechanism is well known in the art, it is not illustrated in the drawings.

The read/write operations of the floppy disk 20 may be performed in either the open position or closed positions, since the floppy disk drive device 21 is mounted within the unit 3. By arranging the front surface of the floppy disk 20 parallel to the front surface of the computer, the depth B of the computer is reduced to a minimum distance, which is sufficient to provide the stability of the computer when it is standing on a desk top. In the closed or retracted position, the slot 22 is hidden within the personal computer 1, whereby the slot 22 is protected against dust or other undesirable particles in the environment.

In FIGS. 1 and 10, the mechanism for pivoting the keyboard 4 between the closed position shown in FIG. 2 and the opened position shown in FIGS. 1 and 4 is illustrated. Leg members 13 are pivotally mounted at pivot points 14 to both the right and left sides of the keyboard 4. FIG. 10 shows the right side structure. The leg members 13 support the member 11. A surface 19 of the leg member 13 is supported by a receiving surface 15. The round surfaces 15 and 19 permit the keyboard 4 to pivot between the closed position and the open position. A similar structure to the one shown in FIG. 10 is provided for the left side; the left structure being a mirror image of the right structure.

The leg member 13 is detachably mounted on the receiving surface 15, whereby the keyboard 4 may be detached from the computer 1, as shown in FIG. 10. When the keyboard 4 is detached from the computer, the leg member 13 may be pivoted in the clockwise direction from the position shown in the FIG. 10 to support the keyboard in an inclined position.

In FIGS. 1 and 11, the latch mechanism 5A and 5B to retain the keyboard 4 in the closed position is illustrated. In particular, FIG. 11 shows the right side latch mechanism 5A. The left side latch mechanism 5B is similar to the right side mechanism 5A, except that the left side mechanism is a mirror image of the right one. The latch mechanism 5A includes a slide button 16, a bar 17 coupled to the slide button 16, and an aperture 18. The aperture is formed on the right side wall of the personal computer, as shown in FIG. 1.

The rightward movement of the slide button 16 by the operator causes the bar 17 to enter the aperture 18, whereby the keyboard 4 is locked in the closed position. The leftward movement of the slide button 16 causes the bar 17 to retract from the aperture 18, thereby releasing the latch mechanism.

We claim as our invention:

1. A display assembly for a computer, comprising in combination:
    a display device;
    a first member having a first pivot point, said first member being pivotally attachable to a frame of a computer at said first pivot point;
    a second member having a second pivot point, said second member being pivotally attached to said first member a said second pivot point, said second member being attached to said display device;
    a frictional mechanism attached to said first and second members, said frictional mechanism including: a cam surface provided on said second member; a shoe movably attached to said first member; and a first spring having one end fixed to said first member and the other end engaged on said shoe, such that said shoe is frictionally engaged with said cam surface.

2. The display assembly of claim 1, further comprising a second spring attached to said first member, such that said first member is biased to move in a first direction.

3. A computer, comprising in combination:
    a case enclosing a computer, said computer including a supporting frame, a keyboard and a disk drive;
    a display device movable between a retracted position and a pulled-out position;
    a first member having a first pivot point, said first member being pivotally attached to said frame at said first pivot point;
    a second member having a second pivot point, said second member being pivotally attached to said first member at said second pivot point, said second member being attached to said display device; and
    a frictional mechanism attached to said first and second members such that said display device can be positioned at variable angles with respect to said case, said frictional mechanism including: a cam surface provided on said second member; a shoe movably attached to said first member; and a first spring having one end fixed to said first member and the other end engaged on said shoe, such that said shoe is frictionally engaged with said cam surface.

4. The computer of claim 3, further comprising a second spring having one end attached to said first member, and the other end attached to said frame, such that said first member is biased to move in a first direction.

5. The computer of claim 4, further comprising means for latching said display device in a retracted position.

* * * * *